United States Patent
Vigilant et al.

(10) Patent No.: US 12,499,186 B2
(45) Date of Patent: Dec. 16, 2025

(54) METHOD TO PROTECT PROGRAM IN INTEGRATED CIRCUIT

(71) Applicant: THALES DIS FRANCE SAS, Meudon (FR)

(72) Inventors: David Vigilant, Malakoff (FR); Jean-Roch Coulon, Le Tholonet (FR); Jerome Vasseur, Venelles (FR)

(73) Assignee: THALES DIS FRANCE SAS, Meudon (FR)

( * ) Notice: Subject to any disclaimer, the term of this patent is extended or adjusted under 35 U.S.C. 154(b) by 137 days.

(21) Appl. No.: 18/555,543

(22) PCT Filed: Apr. 15, 2022

(86) PCT No.: PCT/EP2022/060195
§ 371 (c)(1),
(2) Date: Oct. 16, 2023

(87) PCT Pub. No.: WO2022/233490
PCT Pub. Date: Oct. 27, 2022

(65) Prior Publication Data
US 2024/0211551 A1 Jun. 27, 2024

(30) Foreign Application Priority Data
Apr. 19, 2021 (EP) .................................. 21305512

(51) Int. Cl.
*G06F 21/14* (2013.01)
*G06F 21/12* (2013.01)

(52) U.S. Cl.
CPC ............ *G06F 21/14* (2013.01); *G06F 21/125* (2013.01)

(58) Field of Classification Search
CPC .............................. G06F 21/14; G06F 21/125
USPC ........................................................... 726/26
See application file for complete search history.

(56) References Cited

U.S. PATENT DOCUMENTS

| | | | |
|---|---|---|---|
| 6,591,415 B1 * | 7/2003 | Torrubia-Saez | .... G06F 21/1011 717/172 |
| 6,643,775 B1 | 11/2003 | Granger et al. | |
| 2005/0257054 A1 * | 11/2005 | Tucker | ................ G06F 21/6281 713/167 |
| 2008/0215860 A1 | 9/2008 | Jacob et al. | |
| 2009/0083521 A1 * | 3/2009 | Sato | ........................ G06F 21/14 712/E9.016 |
| 2017/0091486 A1 * | 3/2017 | Clarke | .................... G06F 21/14 |

OTHER PUBLICATIONS

International Search Report (PCT/ISA/210) and Written Opinion (PCT/ISA/237) mailed on Jul. 29, 2022, by the European Patent Office as the International Searching Authority for current International Application No. PCT/EP2022/060195—[10 pages].

* cited by examiner

*Primary Examiner* — Michael S McNally

(57) ABSTRACT

Provided is a method for protecting a program in an integrated circuit product. The method includes creating one or more opcode blocs to respectively replace one or more original opcodes of said program, said opcode bloc comprising a number of fictional opcodes and the corresponding original opcode, said fictional opcodes being to be executed without taking into account their results and without impacting an expected result of said program, said number and a position of the original opcode in said opcode bloc being randomly determined by a random or pseudo random number generator of said integrated circuit product, and executing said one or more opcode blocs.

6 Claims, 3 Drawing Sheets

METHOD TO PROTECT PROGRAM IN INTEGRATED CIRCUIT

FIELD

The present invention relates to a method to protect a program in an integrated circuit product adapted to execute the program and susceptible to be attacked. The invention also pertains to an integrated circuit using said method.

BACKGROUND

There is a constant need to increase system resistance against physical attacks. Such attacks as side-channel attacks and fault attacks generally require a huge number of executions of the same process to reach their target.

Some attack types may take benefit of predictable timing execution as for instance to setup and reproduce a laser attack, to synchronize event over several execution for correlation attacks or to measure the timing duration for a timing attack. Every logical operation in a computer takes time to execute, and the time can differ based on the input. With precise measurements of the time for each operation, an attacker can work backwards to the input.

Today several counter-attack solutions are existing to modify the predictable timing execution. For example, random clock stealer solution proposes to remove (or steal) clock pulses. Clock jitter solution proposes to continuously modify clock frequency. Random-delay-inserted-by-software solution proposes that when a sensitive code needs to be protected, a processing unit executes a function which executes non-predictable number of instructions.

However, these existing solutions are not satisfactory and have their drawbacks. For example, random clock stealer and clock jitter are applied on all or a big part of the code execution, even on the part of code which is not sensitive. Thus, the performance impact is high on the product executing the code. When the random clock stealer stops the clock, the power consumption drops with a characteristic signature. This limits the countermeasure efficiency.

Random-delay-inserted-by-software implies to add functions in the code, which cause the code size to increase. Random delay is implemented in a dedicated function that must be called. The calling and return mechanisms cost a significant number of clock cycles. The timing cost to insert random delay functions is high.

Thus, those counter-attack methods are not satisfactorily efficient and further alternative and advantageous solutions would, accordingly, be desirable in the art to be implemented in complement to these previous counter-attack methods.

SUMMARY

The present invention aims at avoiding, or at least making more difficult the above-mentioned malicious attacks in an efficient manner.

The invention proposes a method for protecting a program in an integrated circuit product, the method comprising steps of:

creating one or more opcode blocs to respectively replace one or more original opcodes of the program, the opcode bloc comprising a number of fictional opcodes and the corresponding original opcode, the fictional opcodes being to be executed without taking into account their results and without impacting an expected result of said program, the number and an execution position of the original opcode in the opcode bloc being randomly determined by a random or pseudo random number generator of the integrated circuit product;

executing the one or more opcode blocs.

Thus, the invention allows the integrated circuit product's process, when its processor executes an original instruction (e.g., opcode such as OR, AND, XOR) of the program (for example, a cryptographic program processing sensitive data), to trigger the execution of other instructions (e.g., fictional opcodes), which are executed without taking into account their operation or return values (e.g., the results of these fictional instructions are stored in a garbage register of the processor or not stored) and without impacting an expected result of the program.

As a result, for one original (or real) opcode of the program, a replacing opcode block comprising this original opcode and one or more fictional (or fake) opcodes is generated and executed. The number of fictional opcodes for every opcode block is randomized by using the random number generator. And the position (or order) for executing the original opcode in every opcode block is also randomized.

Thus, the invention allows to mask (or hide) the execution timings of the original opcodes of the program in order to prevent an attacker from analyzing a regular execution pattern of the program and finding a security breach.

The invention also allows to dynamically change the execution pattern of the same program since the execution timings of the original opcodes are different each time the program is executed, thanks to the randomization of the number of fictional opcodes and the execution positions of the original opcodes.

The proposed solution will not impact the product functionality. The performance consumption of the fictional opcodes is similar to that of the regular opcode execution. As the method is implemented by hardware (i.e., processor design), but not by software (i.e., function calls), the invention does not have a big impact on the product performance.

This solution is further compatible with the existing counter-measures as mentioned above.

Therefore, the method according to the present invention allows reducing the risks of malicious attacks in a simple and efficient way. At least, the attacks are more complex to carry out for a malicious attacker.

In an example, at least part of said created fictional opcodes are chosen from a list of fictional opcodes pre-stored in said integrated circuit product.

This enables the processor to automatically create, for example during its decode stage, the fictional opcodes without requiring a developer to manually add the fictional opcodes in an assembly code of the program.

In an example, at least part of the created fictional opcodes are copies of the original opcodes.

This optional feature is simple to realize and can also achieve the same objective to hide execution timings of the real opcodes of the program.

In an example, the operands associated with the created fictional opcodes (either those chosen from the pre-stored list or those copied from the original opcodes) may be generated by the random or pseudo random number generator. Alternatively, they may be also chosen, randomly or in sequence by the processor from a pre-stored list.

These fictional operands are made to be used by the fictional opcodes. The aim of use of the fictional operands and opcodes is to enable the integrated circuit card to execute the sensitive program (or at least a sensitive part of the program) in a manner that an attacker can hardly predict the execution timing of the sensitive instructions (opcodes and data).

As mentioned before, the calculation results of the fictional opcodes may be stored in a garbage registers or not stored in order to not make any impacts on the normal (or expected) result of the real opcodes.

In an example, the method further comprises identifying the one or more original opcodes to be replaced from a list of target opcodes pre-stored in the integrated circuit product.

This enables the processor to modify the assembly code for only part of the program (for example, the sensitive part). Thus, the method advantageously does not require a great performance consumption.

The invention also concerns a processor implementing the method for protecting a program in an integrated circuit product according to the invention.

The invention also concerns an integrated circuit product comprising the processor according to the invention.

To the accomplishment of the foregoing and related ends, one or more embodiments comprise the features hereinafter fully described and particularly pointed out in the claims.

BRIEF DESCRIPTION OF THE DRAWINGS

The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION OF EMBODIMENTS OF THE INVENTION

Figure 1:
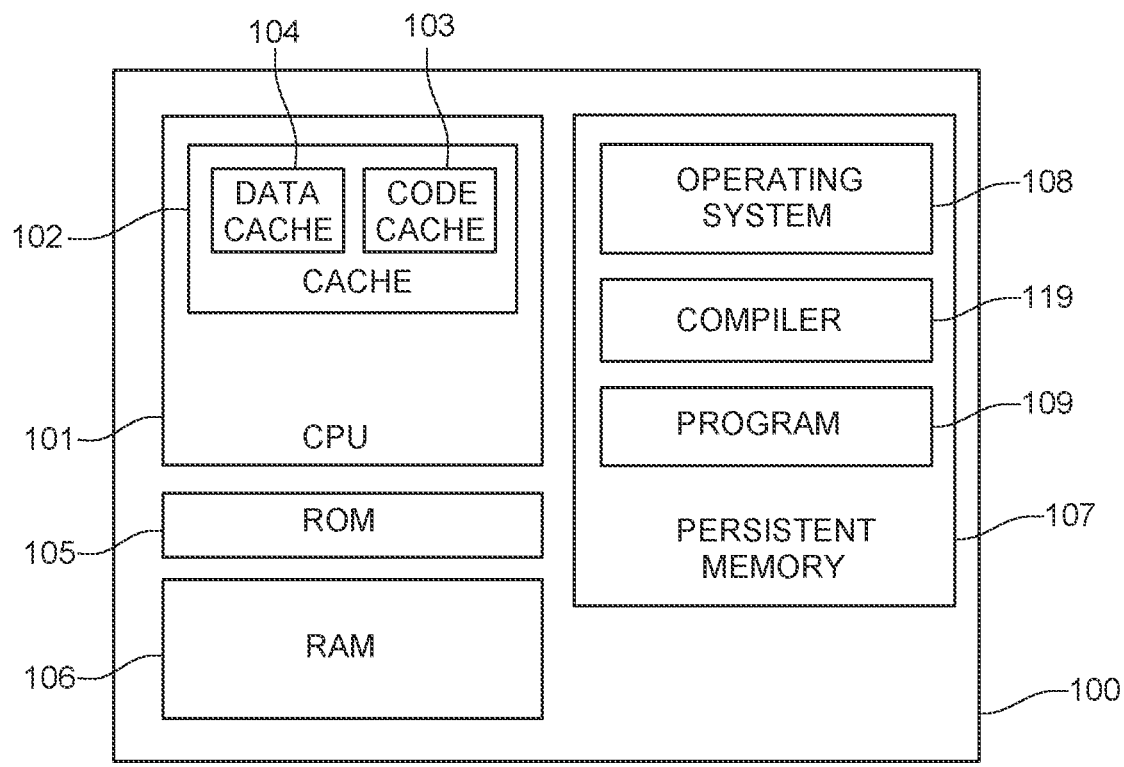
FIG. 1 schematically represents a hardware structure of a computing device such as an integrated circuit product in accordance with an embodiment of the invention.

The same elements have been designated with the same reference numerals in the different drawings. For clarity, only those elements and steps which are useful to the understanding of the present invention have been shown in the drawings and will be described.

With reference to FIG. 1, a computing device such as an integrated circuit or a smart card may be adapted to protect against physical attacks (such as laser fault attacks, side-channel attacks, correlation attacks and timing attacks) by enabling the computing device, especially its CPU, to modify original instructions of a sensitive program (e.g., cryptographic algorithms) or at least sensitive part of a program by adding random fictional instructions in order to render execution timings of the original instructions unpredictable.

In one embodiment of the invention, a computer device 100 may include a CPU (or processor) 101 comprising a cache 102.

Cache 102 may include a code cache 103 and a data cache 104 to store instructions that compiler 110 translates from program 109. Processor 101 uses the code cache 103 to store instructions (operation codes, or opcodes) prior to execution, based on the currently executing application program, and uses data cache 104 to store data arguments (operands) for each opcode, when applicable. Processor 101 may use instruction pipelining capabilities to fetch instructions (typically including an opcode and an operand) and store them in code cache 103.

Computing device 100 may also include RAM 105 and ROM (Read-Only Memory) 106. In addition, computing device 200 may store in memory 107 (e.g., a hard disk or other persistent storage) an operating system module 108 and program 109, and compiler 110. Compiler 110 translates program 109 into a list of instructions so that CPU 101 may process the instructions.

Compiler 110 generates a list of instructions (e.g., by translating program 209's codes into instructions). The instructions are stored in cache 102 so that CPU 101 may fetch and execute the instructions in a sequence.

Before executing at least some of the instructions, CPU 101 creates new instructions (e.g., fictional opcodes) in hardware layer (e.g., via CPU instruction decode module) to automatically modify original instructions (e.g., original opcodes) of program 109, as described further below. Operating system module 108 controls the overall operation of the computer device, as is known in the art with respect to operating systems.

Vulnerable code 109 may be any software application or code component that is vulnerable to attacks as described above.

One of skill in the art will appreciate that other types of computing device may be adapted to perform according to the invention. For example, computing device 100 may alternatively be a mobile telephone (or other mobile terminal), a personal digital assistant, an APPLE® computer using a Motorola or other type processor, a reduced instruction set computer (RISC), or any other type of computer or data processing system. The devices and methods disclosed herein may benefit devices using both fixed-size (RISC-based systems) and variable-sized (CISC-based systems) instruction sets.

Figure 2:
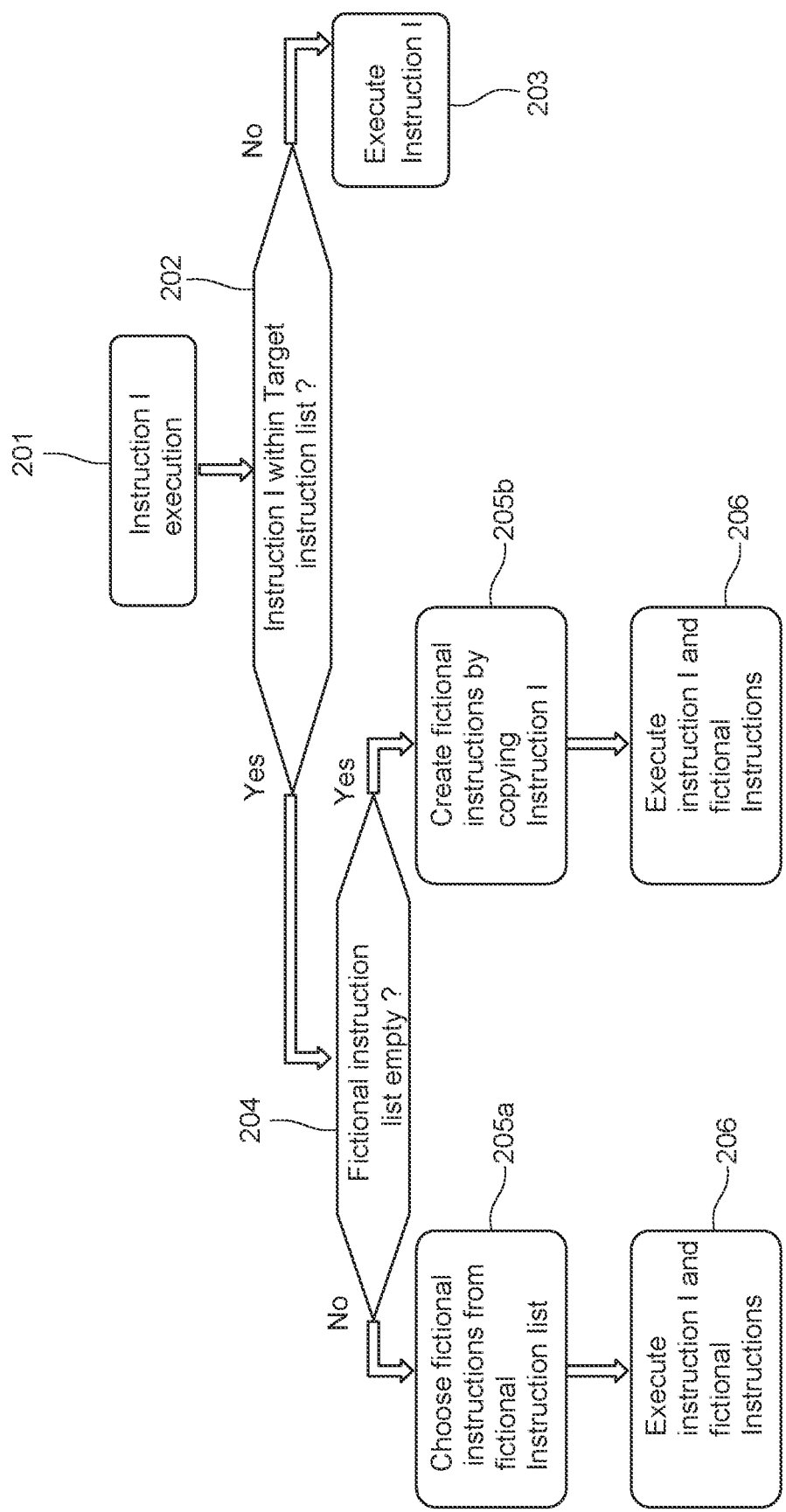
FIG. 2 schematically represents a flowchart of a method in accordance with an embodiment of the invention.

With further reference to FIG. 2, the invention provide an exemplary method 200 for protecting a vulnerable code (or program) 109 against attacks (specifically timing attacks). Initially, either a user or an automated process (e.g., another program) instructs computing device 100 (specifically, processor 101) to run program 109. Upon being instructed to run the program, compiler 110 translates program 109 into a list of instructions. CPU 101 begins to fetch the instructions in a sequence, stores the fetched instruction in code cache 103, and stores the fetched data in data cache 104.

In the current example, when CPU 101 proceeds to execute (201) an fetched instruction I (i.e., an original instruction of the program), CPU 101 identifies (202) whether the instruction I (e.g., opcode such as OR) is present in a list of target instructions which is pre-stored in CPU 101 (e.g., in predetermined registers of CPU 101, or another internal memory of the CPU). This target instruction list are used to indicate to CPU 101 those sensible instructions (e.g., mov, store, xor, etc.) to be protected against attacks such as timing attacks.

Pre-storing such a target instruction list in CPU 101 enables it to apply the invention's method on only one or more important parts of program 109, not on the entire program. Thus, we may achieve a better balance between performance and protection.

It is noted that a skilled person in the art would easily understand that in a variant the target instruction list may be omitted. In that case, CPU 101 may apply the protection method of the invention on all instructions of the program. This may be beneficial if the entire program is critical to be protected. In another example, a developer may manually identify the sensitive part of the program and instruct CPU 101 to trigger the adding of fictional instructions by using a specific instruction (e.g., secure_mov, secure_store, secure_xor, etc., created for the compiler to implement the new method). These optional and alternative features thus may offer a certain flexibility for the present invention's implementation.

After the optional step 202, if the instruction I is not identified by CPU 101 from the pre-stored target instruction list, CPU 101 executes (203) the instruction I. In other words, the instruction is executed without any protection measures of CPU 101 since it is determined to be non-sensitive.

Otherwise, if the instruction I is identified by CPU 101 from the pre-stored target instruction list, CPU 101 may, in the current example, determine (204) whether there is a list of fictional instructions pre-stored in CPU 101 (e.g., in predetermined registers of the CPU). Or, CPU may determine (204) whether a pre-stored fictional instruction list is empty or not.

If it is determined (204) that the fictional instruction list exists or is not empty, CPU 101 chooses, in the current example, a number D of fictional instructions (e.g., opcodes such as XOR, AND, OR) from the list to create (205a) an instruction block composed of the chosen fictional instructions and the instruction I. This instruction block replaces the original instruction I.

Thus, CPU 101 will execute (206) the created instruction block instead of executing the only instruction I in order to hide the execution timing of the instruction I so as to prevent attacks.

In this example, the number D may be determined by a random or pseudo random number generator, for example implemented in a register of CPU 101 or an external storage device (e.g. a peripheral device) which determines and transmits the number D to the CPU. Thus, the number of fictional instructions used by CPU 101 for each original instruction I to be protected may be different. The number D may be defined by CPU 101 to be in a limited range to control performance consumption.

The choosing of the fictional instructions by CPU 101 may be in a random manner.

Data to be used with the fictional instructions (which may be called fictional data) may also be generated by a random or pseudo random number generator.

A position P (or clock cycle, which is between 0 and D) for executing the original instruction I among positions $0, \ldots, P-1, P+1, \ldots, D-1$ of the fictional instructions in the instruction bloc may also randomly determined by a random or pseudo random number generator. In other words, the original instruction I is executed by CPU 101 with real (or expected) data (e.g., operands specified by program 109) for one time during the $P^{th}$ clock cycle. The added fictional instructions are executed by CPU 101 with fake (or fictional) data (e.g., operands generated by the random number generator) for D times respectively during the $0^{th}, \ldots, P-1^{th}, P+1^{th}, \ldots, D-1^{th}$ clock cycles.

The randomization of the number D, the position P, and possibly the other parameters as mentioned above allows rendering the prediction of the execution timing of the real instruction I extremely difficult and even impossible, when CPU executes the instruction block instead of the mere instruction I.

In the meanwhile, since the invention is implemented at hardware level by modifying the CPU's instruction decoding behaviors, the invention allows a higher computing performance compared with the existing software level counter-measure solutions. Further, the invention's solution does not require any modifications on program 109 per se. The fictional instructions are added during CPU 101's decode stage.

If CPU 101 determines (204) that the predetermined fictional instruction list does not exist or is empty, CPU 101 may still create (205b) the number D of fictional instructions by using directly copies of the original instruction I as the fictional instructions. The execution position (or order) P of the real instruction I among the fictional instructions I may be randomly determined. Fictional operands may be used with those fictional instructions. Results from the fictional instructions are not taken into account by CPU 101, which may be even not stored.

Then CPU 101 executes (206) the instruction bloc comprising the D+1 instructions I, wherein the original instruction I is executed by CPU 101 with the expected data for one time during the $P^{th}$ clock cycle. The added fictional instructions (which are same as the original instruction I) are executed by CPU 101 with fake (or fictional) data (e.g., operands generated by the random number generator) for D times respectively during the $0^{th}, \ldots, P-1^{th}, P+1^{th}, \ldots, D-1^{th}$ clock cycles.

It shall be noted that a skilled person in the art would easily appreciate that in a variant the invention's method may omit the step 204 of checking the existence of the pre-stored list of fictional instructions. In that case, CPU 101 may, after determining that the instruction I needs to be protected, automatically replace the instruction I with a predetermined fictional instruction (which may be same as or different from the original instruction I).

Figure 3:
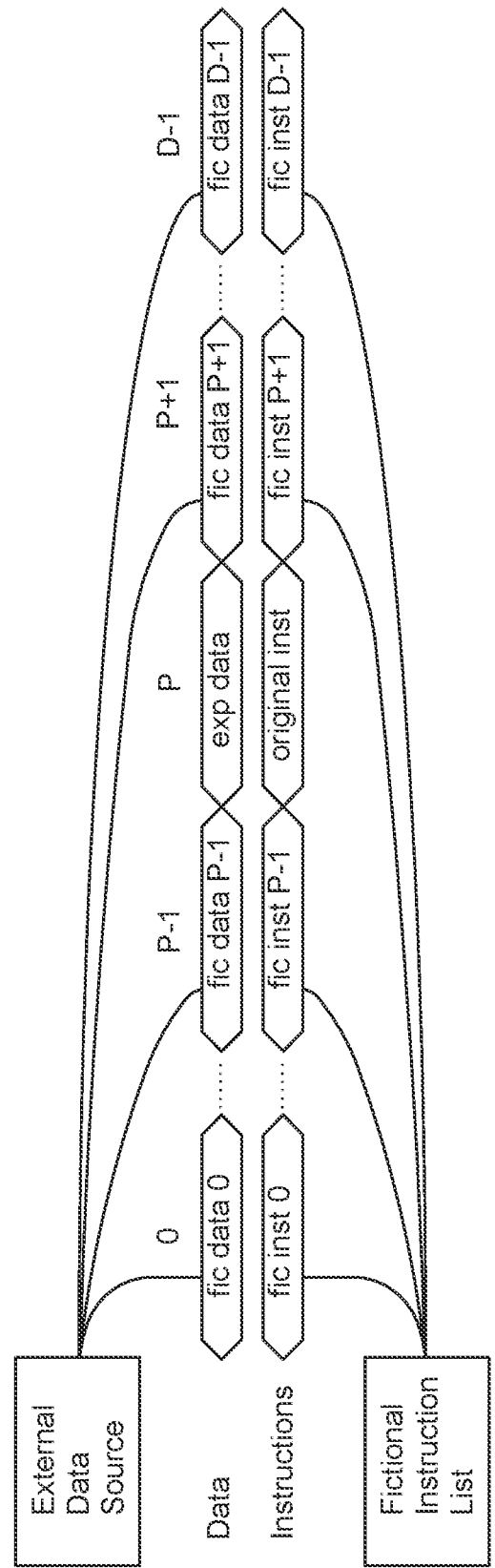
FIG. 3 schematically represents a diagram of execution order for instructions within an instruction block in accordance with an embodiment of the invention.

Now we refer to FIG. 3, a schematic diagram illustrates execution orders/timings for instructions within an instruction block created by CPU 101 to replace an original instruction.

The number D of the fictional instructions added to protect the original instruction I and the position P of execution of the original instruction I may be determined by a random or pseudo random number generator. The duration D may be within a defined limited range. The position P is in the range 0 to D−1. The real instruction I is executed at the P clock cycle. During the clock cycles $0, \ldots, P-1, P+1, \ldots, D$, the fictional instructions may be respectively executed with random or pseudo random data. The results of these fictional instructions are stored in a garbage register or not stored.

In the above detailed description, reference is made to the accompanying drawings that show, by way of illustration, specific embodiments in which the invention may be practiced. These embodiments are described in sufficient detail to enable those skilled in the art to practice the invention. The above detailed description is, therefore, not to be taken in a limiting sense, and the scope of the present invention is defined only by the appended claims, appropriately interpreted, along with the full range of equivalents to which the claims are entitled.

The invention claimed is:

1. A method for protecting a program in an integrated circuit product, said method comprising steps of:
   creating one or more opcode blocs to respectively replace one or more original opcodes of said program, said opcode bloc comprising a number (D) of fictional opcodes and the corresponding original opcode, said fictional opcodes being to be executed without taking into account their results and without impacting an expected result of said program, said number (D) and a position (P) of the original opcode in said opcode bloc being randomly determined by a random or pseudo random number generator of said integrated circuit product;

executing said one or more opcode blocs, wherein at least part of said created fictional opcodes are chosen from a list of fictional opcodes pre-stored in said integrated circuit product.

2. The method according to claim 1, wherein at least part of said created fictional opcodes are copies of the original opcodes.

3. The method according to claim 1, wherein the method further comprises:

identifying said one or more original opcodes to be replaced from a list of target opcodes pre-stored in said integrated circuit product.

4. The method according to claim 1, wherein operands associated with said fictional opcodes are generated by said random or pseudo random number generator.

5. A processor for protecting a program for creating one or more opcode blocs to respectively replace one or more original opcodes of said program, said opcode bloc comprising a number (D) of fictional opcodes and the corresponding original opcode, said fictional opcodes being to be executed without taking into account their results and without impacting an expected result of said program, said number (D) and a position (P) of the original opcode in said opcode bloc being randomly determined by a random or pseudo random number generator of said integrated circuit product; and executing said one or more opcode blocs, wherein at least part of said created fictional opcodes are chosen from a list of fictional opcodes pre-stored in said integrated circuit product.

6. An integrated circuit for creating one or more opcode blocs to respectively replace one or more original opcodes of said program, said opcode bloc comprising a number (D) of fictional opcodes and the corresponding original opcode, said fictional opcodes being to be executed without taking into account their results and without impacting an expected result of said program, said number (D) and a position (P) of the original opcode in said opcode bloc being randomly determined by a random or pseudo random number generator of said integrated circuit product; and executing said one or more opcode blocs, wherein at least part of said created fictional opcodes are chosen from a list of fictional opcodes pre-stored in said integrated circuit product.

* * * * *